(12) United States Patent
Kimme et al.

(10) Patent No.: US 9,693,416 B2
(45) Date of Patent: Jun. 27, 2017

(54) METHOD FOR ILLUMINATING AN ENVIRONMENT, ILLUMINATION DEVICE AND CAMERA COMPRISING AN ILLUMINATION DEVICE

(71) Applicant: OSRAM Opto Semiconductors GmbH, Regensburg (DE)

(72) Inventors: Felix Kimme, Stephanskirchen (DE); Peter Brick, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 14/769,152

(22) PCT Filed: Feb. 6, 2014

(86) PCT No.: PCT/EP2014/052338
§ 371 (c)(1),
(2) Date: Aug. 20, 2015

(87) PCT Pub. No.: WO2014/131596
PCT Pub. Date: Sep. 4, 2014

(65) Prior Publication Data
US 2015/0382428 A1    Dec. 31, 2015

(30) Foreign Application Priority Data

Feb. 28, 2013  (DE) .................. 10 2013 203 429

(51) Int. Cl.
*H04N 5/222* (2006.01)
*H05B 33/08* (2006.01)
(Continued)

(52) U.S. Cl.
CPC ......... *H05B 33/0872* (2013.01); *G03B 15/02* (2013.01); *G03B 15/05* (2013.01);
(Continued)

(58) Field of Classification Search
CPC ...... H04N 5/2256; H04N 5/2354; G03B 7/16; G03B 15/05; G03B 2215/05; G06K 9/2027
(Continued)

(56) References Cited

U.S. PATENT DOCUMENTS 5,001,551 A  3/1991  Otto
5,424,798 A  6/1995  Takagi
(Continued)

FOREIGN PATENT DOCUMENTS

CN    1627356 A     6/2005
DE    102007042573 A1   3/2009
(Continued)

*Primary Examiner* — Kelly L Jerabek
(74) *Attorney, Agent, or Firm* — Slater Matsil, LLP

(57) ABSTRACT

In a method, a spectral performance of the electromagnetic radiation is chosen in such a way that an integral of the spectral performance across a wave length interval between 380 nm and 780 nm has a nominal value, an integral of the spectral performance across a wave length interval between 420 nm and 460 nm has a first value, an integral of the spectral performance across a wave length interval between 510 nm and 550 nm has a second value, and an integral of the spectral performance across a wave length interval between 580 nm and 620 nm has a third value. The ratios of these values are chosen to be within certain ranges.

19 Claims, 13 Drawing Sheets

(51) Int. Cl.
    *H04N 5/225*     (2006.01)
    *H04N 9/73*     (2006.01)
    *G03B 15/02*     (2006.01)
    *G03B 15/05*     (2006.01)
    *H05B 37/02*     (2006.01)

(52) U.S. Cl.
    CPC ............ *H04N 5/2256* (2013.01); *H04N 9/73* (2013.01); *H04N 9/735* (2013.01); *H05B 37/0218* (2013.01); *G03B 2215/0567* (2013.01); *G03B 2215/0571* (2013.01)

(58) Field of Classification Search
    USPC .................................................. 348/370–371
    See application file for complete search history.

(56) References Cited

U.S. PATENT DOCUMENTS

| | | |
|---|---|---|
| 6,686,691 B1 | 2/2004 | Mueller et al. |
| 6,839,088 B2 * | 1/2005 | Dicarlo ................ G01N 21/55 348/223.1 |
| 7,176,612 B2 | 2/2007 | Omoto et al. |
| 8,736,709 B2 * | 5/2014 | Myhrvold .............. H04N 9/735 348/224.1 |
| 2005/0128497 A1 | 6/2005 | Hirashima et al. |
| 2005/0134723 A1 | 6/2005 | Lee et al. |
| 2005/0254809 A1 | 11/2005 | Yamashita |
| 2006/0133061 A1 | 6/2006 | Maeda |
| 2009/0185358 A1 | 7/2009 | Liu et al. |
| 2010/0127282 A1 | 5/2010 | Harbers et al. |
| 2011/0280561 A1 | 11/2011 | Geffert et al. |
| 2012/0026356 A1 | 2/2012 | Nakagawara |
| 2013/0010155 A1 | 1/2013 | Hamada |
| 2014/0085534 A1 * | 3/2014 | Bergquist .............. G03B 15/05 348/371 |

FOREIGN PATENT DOCUMENTS

| | | |
|---|---|---|
| EP | 1145282 A2 | 10/2001 |
| EP | 1950978 A1 | 7/2008 |
| EP | 2544444 A1 | 1/2013 |
| JP | 2002006747 A | 1/2002 |
| JP | 2002060747 A | 2/2002 |
| JP | 2004274344 A | 9/2004 |
| JP | 2005204296 A | 7/2005 |
| JP | 2008283221 A | 11/2008 |

* cited by examiner

METHOD FOR ILLUMINATING AN ENVIRONMENT, ILLUMINATION DEVICE AND CAMERA COMPRISING AN ILLUMINATION DEVICE

This patent application is a national phase filing under section 371 of PCT/EP2014/052338, filed Feb. 6, 2014, which claims the priority of German patent application 10 2013 203 429.6, filed Feb. 28, 2013, each of which is incorporated herein by reference in its entirety.

TECHNICAL FIELD

The present invention relates to a method for illuminating an environment with electromagnetic radiation, to an illumination device, and to a camera having an illumination device.

BACKGROUND

It is known to configure cameras with flash light devices in order to additionally brighten scenes to be recorded by the camera in the case of insufficient illumination conditions. This improves a signal-to-noise ratio. It is known to equip such flash light devices with discharge lamps. Flash light devices which comprise one or more light-emitting diodes (LEDs) are likewise known. Such flash light devices are used particularly in miniaturized cameras, such as are provided, for example, in cellphones. However, known flash light devices with light-emitting diodes are not optimized in terms of color reproduction.

SUMMARY

Embodiments of the present invention provide a method for illuminating an environment with electromagnetic radiation. Other embodiments of the present invention provide an illumination device. Yet other embodiments of the present invention provide a camera having an illumination device.

In a method for illuminating an environment with electromagnetic radiation, a correlated color temperature of ambient light is determined. A spectral power of the electromagnetic radiation is in this case selected in such a way that an integral of the spectral power over a wavelength interval between 380 nm and 780 nm has a nominal value, an integral of the spectral power over a wavelength interval between 420 nm and 460 nm has a first value, an integral of the spectral power over a wavelength interval between 510 nm and 550 nm has a second value, an integral of the spectral power over a wavelength interval between 580 nm and 620 nm has a third value, the ratio of the first value to the nominal value lies between the sum of $-4.13\times10^{-2}$ and the product of $+1.96\times10^{-5}/K$ and the correlated color temperature and the sum of $+5.63\times10^{-2}$ and the product of $+3.91\times10^{-5}/K$ and the correlated color temperature, the ratio of the second value to the nominal value lies between the sum of $+7.66\times10^{-2}$ and the product of $+7.55\times10^{-6}/K$ and the correlated color temperature and the sum of $+2.08\times10^{-1}$ and the product of $+9.87\times10^{-6}/K$ and the correlated color temperature, and the ratio of the third value to the nominal value lies between the sum of $+1.40\times10^{-1}$ and the product of $-5.77\times10^{-6}/K$ and the correlated color temperature and the sum of $+3.45\times10^{-1}$ and the product of $-2.06\times10^{-5}/K$ and the correlated color temperature. Advantageously, in this method, the environment is illuminated with electromagnetic radiation whose spectral power is distributed in such a way that a photographic recording of the illuminated environment reproduces colors in a similar way as those which a direct observer of the environment perceives. The spectral power distribution of the electromagnetic radiation used to illuminate the environment is in this case dimensioned, in particular, in such a way as to compensate for a distortion of the color reproduction due to color filters of a camera and due to white balancing carried out by the camera. Photographic recordings of an environment illuminated by the method can therefore advantageously have a good color reproduction.

In one embodiment of the method, the spectral power of the electromagnetic radiation is selected in such a way that the ratio of the first value to the nominal value lies between the sum of $-2.13\times10^{-2}$ and the product of $+1.96\times10^{-5}/K$ and the correlated color temperature and the sum of $+1.63\times10^{-2}$ and the product of $+3.91\times10^{-5}/K$ and the correlated color temperature, the ratio of the second value to the nominal value lies between the sum of $+9.66\times10^{-2}$ and the product of $+7.55\times10^{-6}/K$ and the correlated color temperature and the sum of $+1.78\times10^{-1}$ and the product of $+9.87\times10^{-6}/K$ and the correlated color temperature, and the ratio of the third value to the nominal value lies between the sum of $+1.52\times10^{-1}$ and the product of $-5.77\times10^{-6}/K$ and the correlated color temperature and the sum of $+3.19\times10^{-1}$ and the product of $-2.06\times10^{-5}/K$ and the correlated color temperature. Advantageously, the electromagnetic radiation used to illuminate the environment then has a particularly optimized spectral power distribution, so that a photographic recording of the environment can have a further improved color reproduction.

In one embodiment of the method, the spectral power of the electromagnetic radiation is selected in such a way that the ratio of the first value to the nominal value lies between the sum of $-1.30\times10^{-3}$ and the product of $+1.96\times10^{-5}/K$ and the correlated color temperature and the sum of $-2.37\times10^{-2}$ and the product of $+3.91\times10^{-5}/K$ and the correlated color temperature, the ratio of the second value to the nominal value lies between the sum of $+1.17\times10^{-1}$ and the product of $+7.55\times10^{-6}/K$ and the correlated color temperature and the sum of $+1.48\times10^{-1}$ and the product of $+9.87\times10^{-6}/K$ and the correlated color temperature, and the ratio of the third value to the nominal value lies between the sum of $+1.64\times10^{-1}$ and the product of $-5.77\times10^{-6}/K$ and the correlated color temperature and the sum of $+2.93\times10^{-1}$ and the product of $-2.06\times10^{-5}/K$ and the correlated color temperature. Advantageously, the electromagnetic radiation used to illuminate the environment then has an even more greatly optimized spectral power distribution, so that a photographic recording of the environment can have an even further improved color reproduction.

An illumination device is configured in order to carry out a method of the type mentioned above. Advantageously, the illumination device is therefore suitable for illuminating an environment which is intended to be recorded photographically by means of a camera. The illumination device may in this case illuminate the environment in such a way that colors of the environment are reproduced with high color fidelity in a photographic recording of the environment. The illumination device may in this case illuminate the environment in such a way as to compensate for color distortions due to a photographic camera, in particular color distortions due to color filters of the camera.

In one embodiment of the illumination device, it comprises a light-emitting diode. Advantageously, the illumination device can therefore be configured compactly and economically. Furthermore, the illumination device has only a low energy requirement.

In one embodiment of the illumination device, it comprises at least two light-emitting diodes. Advantageously, electromagnetic radiations of the illumination device, emitted by the at least two light-emitting diodes, may be mixed in such a way that a superposition of the electromagnetic radiations has a favorable spectral power distribution.

In one embodiment of the illumination device, it comprises a sensor for detecting ambient light. Advantageously, the sensor for detecting the ambient light makes it possible to take into account a correlated color temperature of the ambient light during illumination of an environment by the illumination device.

A camera has an illumination device of the aforementioned type. Advantageously, the illumination device may be used to illuminate a scene recorded by the camera, so that a signal-to-noise ratio in the photographic recording of the scene is improved. The illumination of the scene by the illumination device may furthermore lead to improved color reproduction of the recording, recorded by the camera, of the scene.

In one embodiment of the camera, the illumination device is configured as a flash device. Advantageously, the illumination device therefore makes it possible to illuminate an environment of the camera at a time at which a photographic recording of the environment is made by the camera.

In one embodiment of the camera, it comprises a digital image sensor. Advantageously, the camera therefore makes it possible to create digital photographic recordings.

In one embodiment of the camera, it is configured as a cellphone. Advantageously, the camera then has a plurality of functions so that a utility of the camera is increased.

BRIEF DESCRIPTION OF THE DRAWINGS

The above-described properties, features and advantages of this invention, as well as the way in which they are achieved, will become more clearly and comprehensively understandable in conjunction with the following description of the exemplary embodiments, which will be explained in more detail in connection with the drawings, in which.

DETAILED DESCRIPTION OF ILLUSTRATIVE EMBODIMENTS

Figure 1:
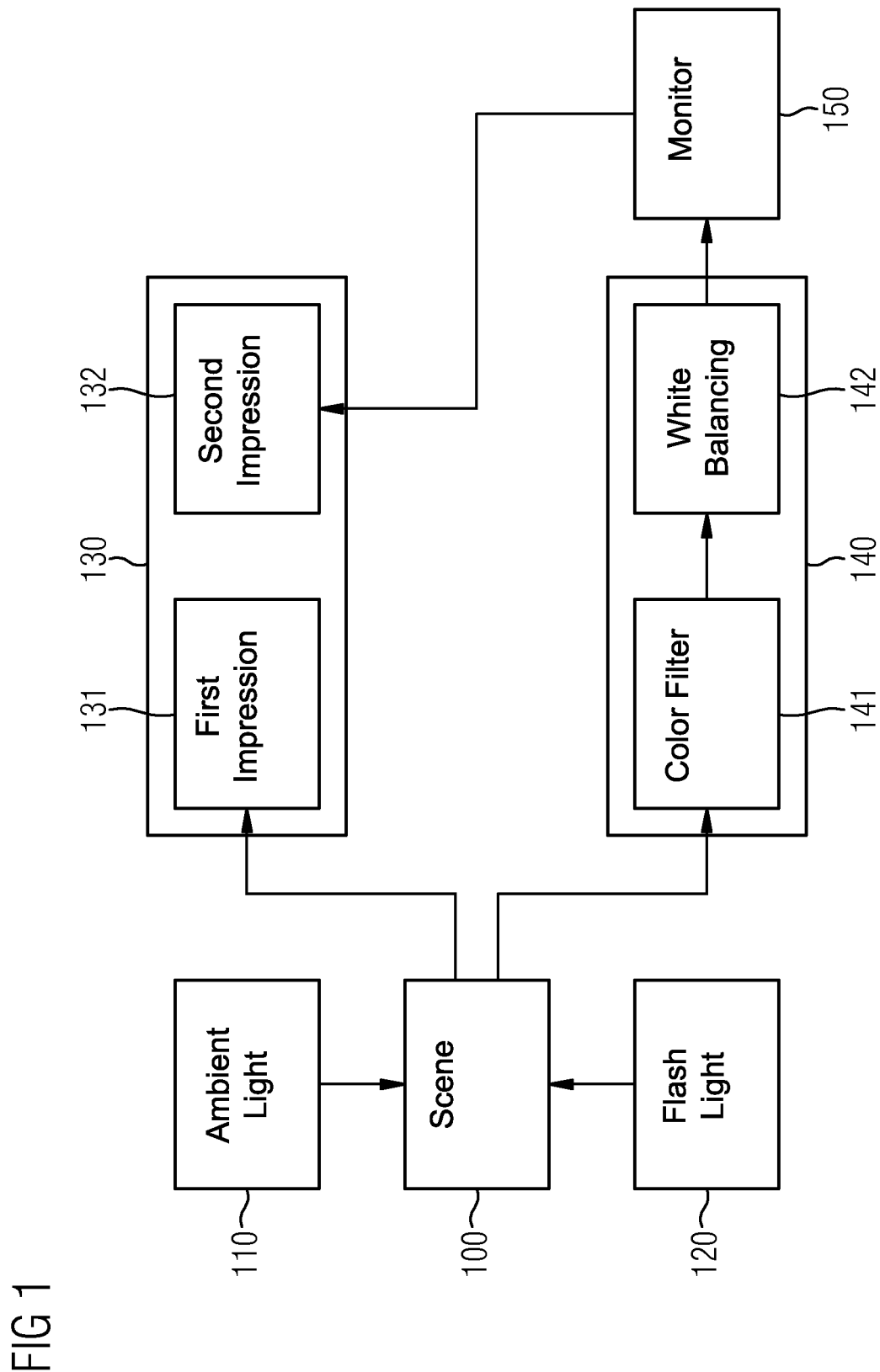
FIG. 1 shows a highly schematized representation of a photographic imaging process in comparison with direct perception of a scene.

FIG. 1 shows a highly schematized representation to explain color differences which may occur when making photographic recordings of a scene.

A human observer 130 observes a scene 100. The scene 100 may, for example, be arranged in a building or in the open air. The scene 100 may comprise an object, a landscape or, for example, also a color chart having one or more defined test colors.

The scene 100 is illuminated by ambient light 110. If the scene 100 is arranged in the open air, then the ambient light 110 may, for example, be daylight, for example, bright sunshine in a cloudless sky, the light of an overcast sky or evening twilight. If the scene 100 is arranged in a closed space, the ambient light 110 may, for example, be the light of an incandescent lamp, a halogen lamp, a fluorescent lamp or a discharge lamp. In all the examples mentioned, the ambient light 110 respectively has different spectral compositions. The ambient light 110 can be characterized approximately by specifying a correlated color temperature of the ambient light 110.

The observation of the scene 100 by the observer 130 leads to a first impression 131 for the observer 130. The first impression 131 indicates how the observer 130 perceives the colors contained in the scene 100. The color perception of the observer 130 depends on the spectral composition of the light reflected from the scene 100 to the observer 130, i.e., on the physical wavelengths of the photons striking the retina of the observer 130. Besides this, however, the first impression 131 of the observer 130 is also determined by a physiological component. The color receptors of the observer can resolve colors in some wavelength ranges better than in others. Furthermore, the eyes of the observer 130 adapt to the color temperature of the ambient light 110 which illuminates the scene 110.

By using a color appearance model, for example, the CIECAM02 model, the first impression 131 of the scene 100 which occurs for the observer 130 can be modeled computationally. The color appearance model makes it possible for the first impression 131 which occurs for the observer 130 to be determined computationally from knowledge of the spectral composition of the ambient light 110 and of the reflection properties of a color contained in the scene 100, for instance a defined test color.

FIG. 1 furthermore shows a schematic representation of the processes when creating and observing a photographic image of the scene 100. The scene 100 is photographed or filmed with a camera 140. The camera 140 may, for example, be a digital camera. In this case, a camera sensor (image sensor) of the camera 140 is preceded by a color filter 141 which filters the light striking the camera chip of the camera 140 from the scene 100. The camera 140 furthermore carries out white balancing 142, by which it attempts to compensate for different color temperatures of the ambient light 110. Both the color filter 141 and the white balancing 142 of the camera 140 lead to a distortion of the colors of the scene 100 which are photographically recorded by the camera 140.

The photographic image, recorded by the camera 140, of the scene 100 may be observed by the observer 130 by means of a monitor 150. The monitor 150 could also cause color distortion. In what follows, however, an ideal monitor 150 which causes no further color distortion will be assumed.

When the image of the scene 100 is observed on the monitor 150, the eyes of the observer 130 adapt to ambient light prevailing at this time. Observation of the image, recorded by the camera 140, of the scene 100 leads to a second impression 132 for the observer 130. The second impression 132 indicates how the observer 130 perceives the colors contained in the image of the scene 100. Because of the described color distortions, the second impression 132 generally does not correspond to the first impression 131. Compared with direct observation of the scene 100, the image of the scene 100 represented on the monitor 150 appears with a false color reproduction to the observer 130.

If, in addition to the spectral composition of the ambient light 110 and the reflection properties of colors contained in the scene 100, the physical filter properties of the color filter 141 and the characteristics of the white balancing 142 carried out by the camera 140 are also known, for example, from measurements, then the second impression 132 occurring for the observer 130 when observing the image of the scene 100 can be modeled by using a color appearance model. By taking into account the aforementioned influencing parameters, the color appearance model allows computational determination of the color perception which occurs for the observer 130 when observing an image of a color contained in the scene 100. The color perception model therefore also makes it possible to quantify a difference between the first impression 131, which the observer 130 receives from direct observation of the scene, and the second impression 132, which the observer 130 receives when observing the photographic image of scene 100.

The camera 140 may comprise a flash device in order to illuminate the scene 100 with a flash light 120 while making a recording of the scene 100, in addition to the illumination by the ambient light 110. The spectral composition of the light reflected from the scene 100 to the camera 140 changes depending on the spectral composition of the flash light 120. The colors contained in the image of the scene 100 and represented on the monitor 150 therefore also change, so that the second impression 132 of the observer 130 also changes depending on the spectral composition of the flash light 120. The spectral composition of the flash light 120 may be selected in such a way that the resulting second impression 132 has the least possible difference from the first impression 131.

In a systematic study, flash lights 120 with a different spectral composition may be compared with one another in order to determine an optimal spectral composition of the flash light 120. For each spectrum, for a number of defined test colors, for example, 84 defined test colors, with the aid of the described models, the first impression 131, which occurs for the observer 130 in direct observation and the second impression 132, which occurs when observing a photographic recording, of the test colors may be calculated. The color distance between the first impression 131 and the second impression 132 may be summed up for all the test colors. The sum of the color distances represents a measure of color difference that occurs when using a flash light 120 with the respective spectrum.

Another criterion for assessing the suitability of a studied spectral composition of the flash light 120 consists in the white balancing 142 carried out by the camera 140. If the white balancing 142 carried out by the camera 140 has matrix elements which are large relative to the rest of the matrix elements, this leads to a large amplification of noise signals of the camera sensor of the camera 140, so that the quality of the recording made by the camera 140 decreases. The spectrum of the flash light 120 should be selected in such a way that excessively large matrix elements do not occur in the white balancing 142 carried out by the camera 140.

From the aforementioned criteria for assessing the suitability of a spectral composition of the flash light 120, an evaluation function (merit value) may be formed. The evaluation function may be defined as the sum of the maximum matrix element of the white balancing 142 and 0.01 times the color distance, summed over all the test colors, between the first impression 131 and the second impression 132. In the case of a favorable spectrum of the flash light 120, this evaluation function has a low value. By comparing different spectra of the flash light 120 in the case of different correlated color temperatures of the ambient light 110, favorable spectra of the flash light 120 can be identified for each correlated color temperature of the ambient light 110.

Figure 2:
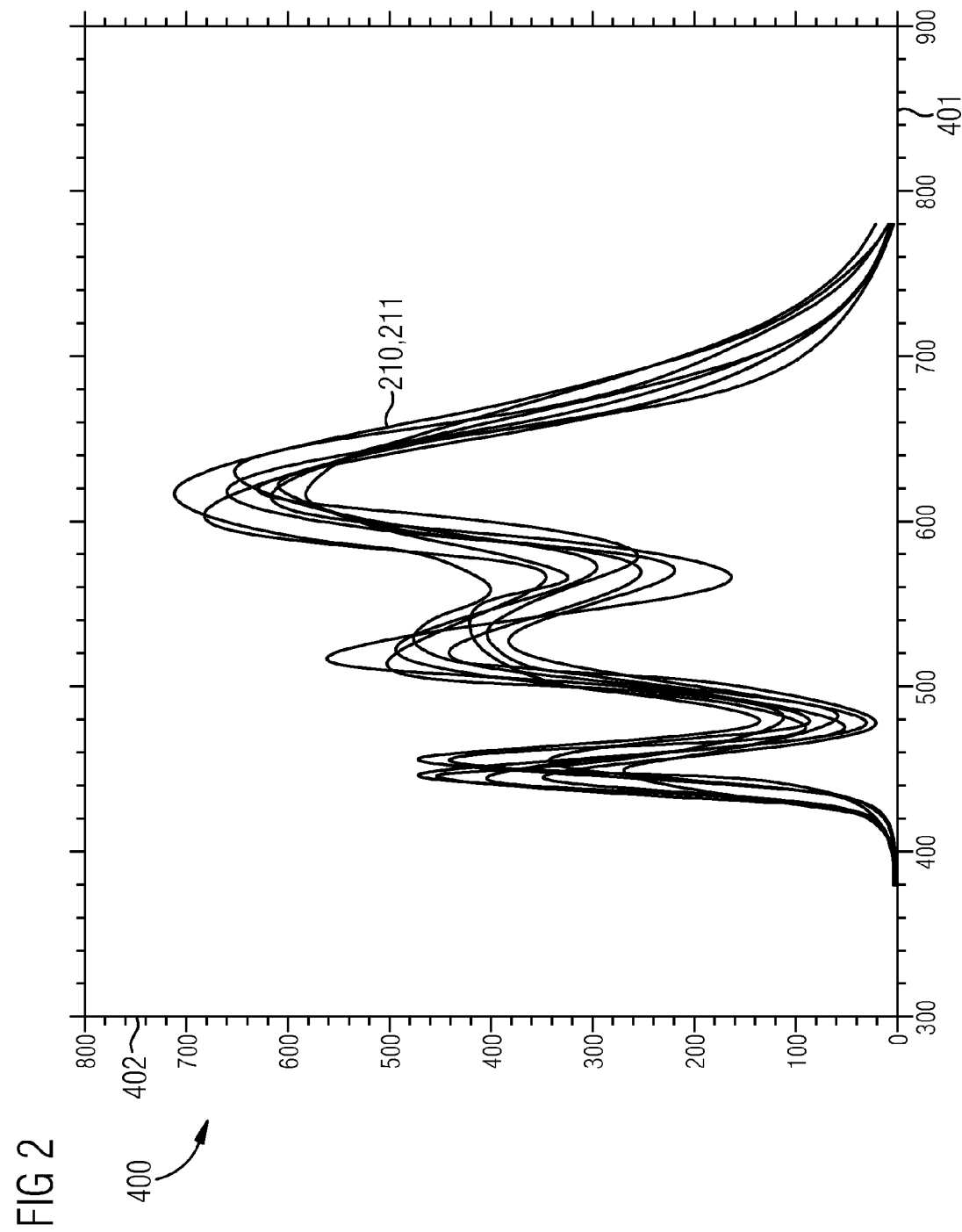
FIG. 2 shows a spectral diagram with a representation of favorable spectral power distributions.

FIG. 2 shows an exemplary spectral diagram 400 in which spectra of the flash light 120, which have proven favorable for ambient light 110 with a correlated color temperature of 3200 K, are represented. A wavelength 401 is plotted in nm on a horizontal axis of the spectral diagram 400. A spectral power 402 in $10^{-6}$ W/nm is plotted on a vertical axis of the spectral diagram 400. A number of spectra 210 are illustrated. These spectra 210 have proven to be favorable spectra 211 in comparison with other spectra, i.e., they have low values of the evaluation function defined above.

Correspondingly favorable spectra 211 can be found for other correlated color temperatures of the ambient light 110. It is found that favorable spectra 211 respectively have characteristic common properties. The characteristic properties of favorable spectra 211 can be expressed in different ways, as will be explained below.

Figure 3:
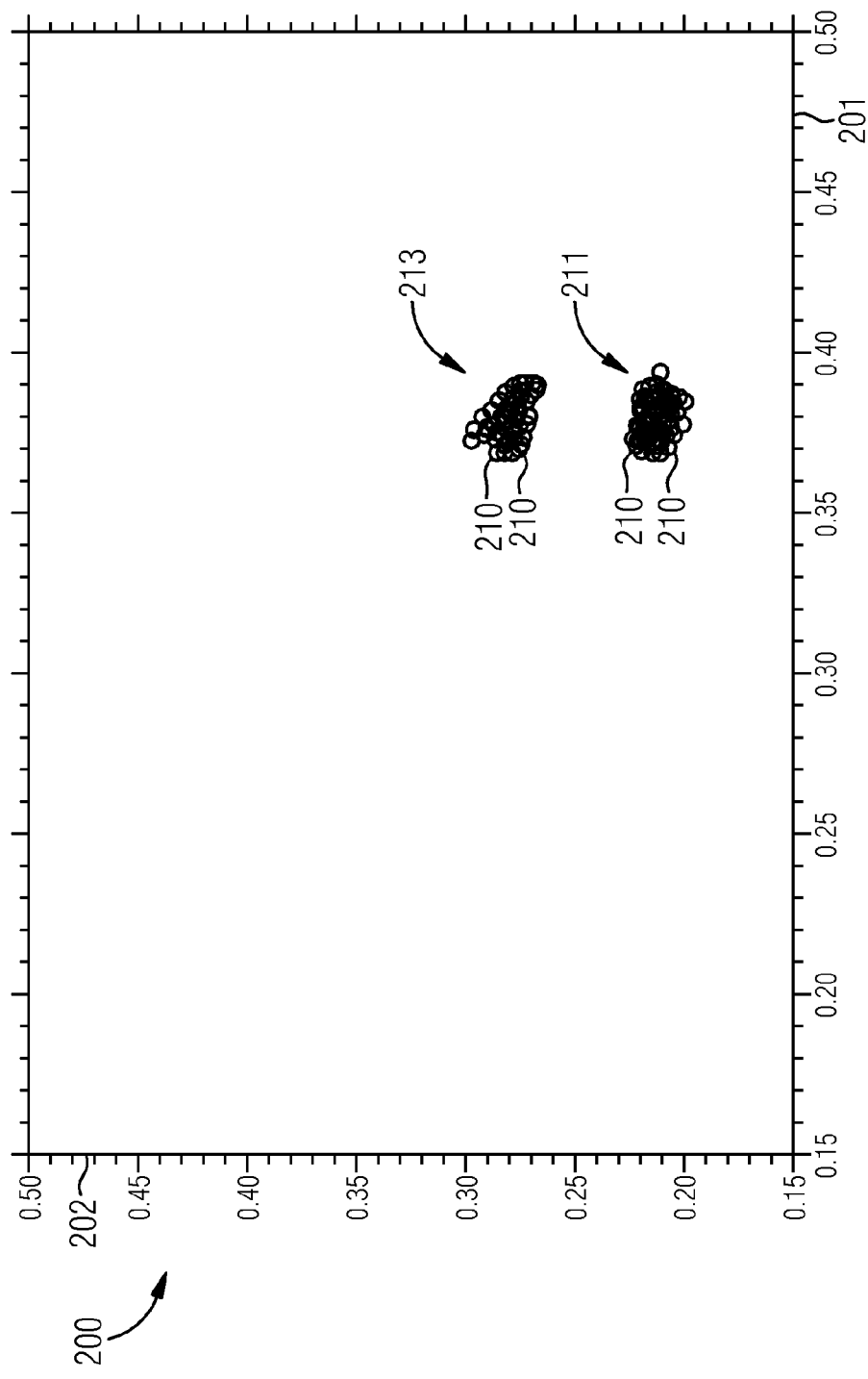
FIG. 3 shows an RGB filter space diagram for comparison of favorable and unfavorable spectra.

The favorable spectra 211 may be characterized in the RGB filter space of the color filter 141 of the camera 140. To this end, the R, G and B signals that are obtained when light with the spectral composition studied is sent directly at the camera 140 are determined. FIG. 3 shows an exemplary RGB filter space diagram 200, as is obtained in the case of ambient light 110 with a correlated color temperature of 3200 K. A red component 201 of the resulting RGB signal in units of R/(R+G+B) is plotted on a horizontal axis of the RGB filter space diagram 200. A blue component 202 of the resulting RGB signal in units of B/(R+G+B) is plotted on a vertical axis of the RGB filter space diagram 200. Each studied spectrum 210 of the flash light 120 forms a point in the RGB filter space diagram 200. Favorable spectra 211, which have a low value of the evaluation function, are grouped in the exemplary RGB filter space diagram 200 at lower values of the vertical axis than unfavorable spectra 213 with a high value of the evaluation function.

Corresponding diagrams may also be compiled for favorable spectra 211 in the case of other correlated color temperatures of the ambient light 110. Overall, it is found that the red components 201 and the blue components 202 of favorable spectra 211 in the case of correlated color temperatures of the ambient light 110 of 2800 K, 3200 K, 4500 K, 5500 K, 6500 K and 8500 K lie in the following ranges:

|  | 2800 K | 3200 K | 4500 K | 5500 K | 6500 K | 8500 K |
| --- | --- | --- | --- | --- | --- | --- |
| R/(R + G + B) | 0.38-0.44 | 0.35-0.41 | 0.28-0.34 | 0.25-0.31 | 0.23-0.29 | 0.21-0.27 |

|  | 2800 K | 3200 K | 4500 K | 5500 K | 6500 K | 8500 K |
|---|---|---|---|---|---|---|
| B/(R + G + B) | 0.16-0.22 | 0.18-0.25 | 0.24-0.3 | 0.28-0.34 | 0.3-0.36 | 0.34-0.4 |

Favorable spectra 211 of the flash light 120 may also be characterized in terms of their spectral components in various wavelength ranges relative the spectral components of the ambient light 110 in the various wavelength ranges. To this end, the following quantities may be defined.

$$F_{tot} = \int_{380\,nm}^{780\,nm} s_{flash}(\lambda)d\lambda;$$

$$F_1 = \int_{420\,nm}^{460\,nm} s_{flash}(\lambda)d\lambda;$$

$$F_2 = \int_{510\,nm}^{550\,nm} s_{flash}(\lambda)d\lambda;$$

$$F_3 = \int_{580\,nm}^{620\,nm} s_{flash}(\lambda)d\lambda;$$

$$U_{tot} = \int_{380\,nm}^{780\,nm} s_{ambient}(\lambda)d\lambda;$$

$$U_1 = \int_{420\,nm}^{460\,nm} s_{ambient}(\lambda)d\lambda;$$

$$U_2 = \int_{510\,nm}^{550\,nm} s_{ambient}(\lambda)d\lambda;$$

$$U_3 = \int_{580\,nm}^{620\,nm} s_{ambient}(\lambda)d\lambda.$$

Here, $s_{flash}(\lambda)$ is the spectral power, dependent on the wavelength $\lambda$, of the flash light 120 and $s_{ambient}(\lambda)$ is the wavelength-dependent spectral power of the ambient light 110.

Figure 4:
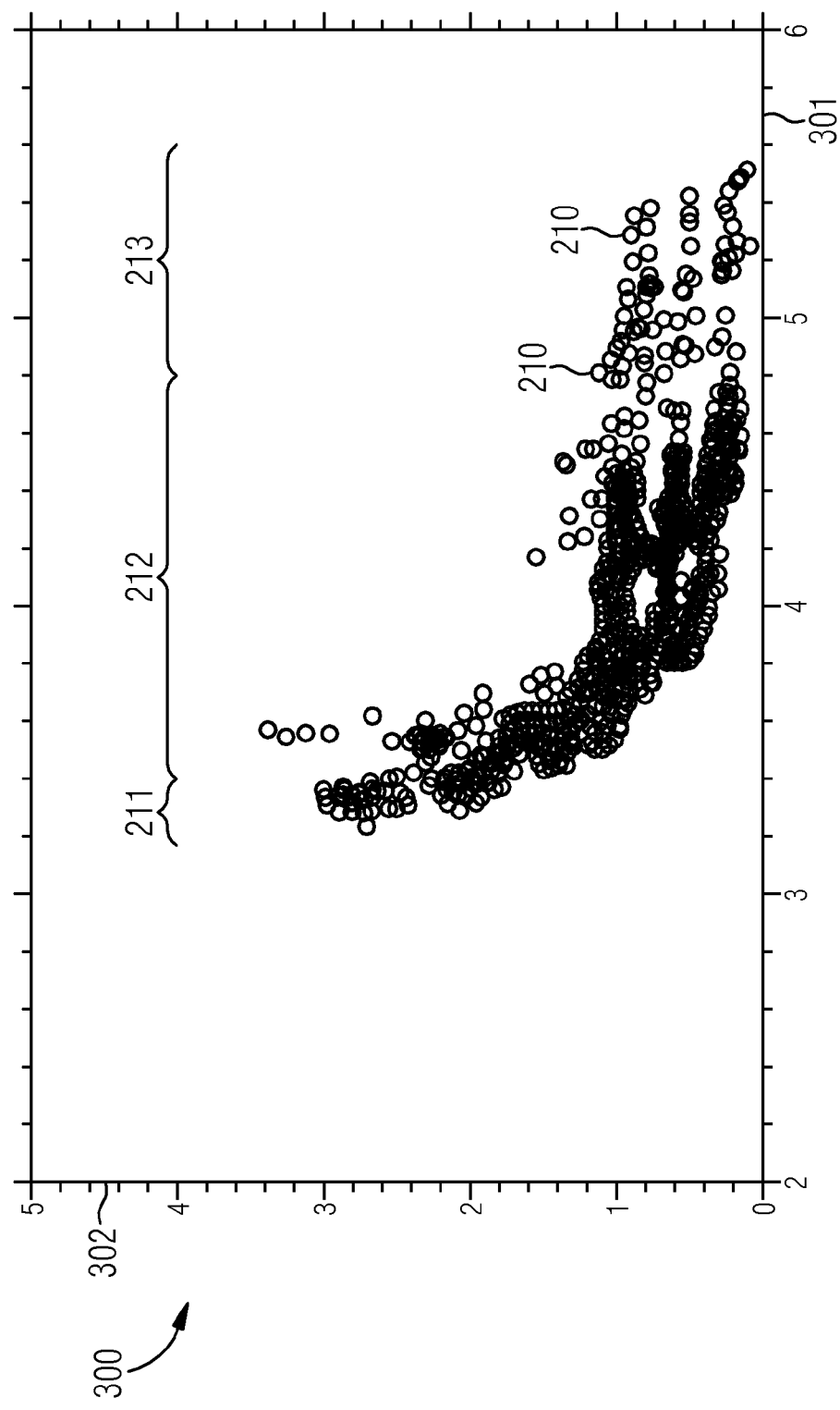
FIG. 4 shows a first spectral diagram relating to ambient light for comparison of favorable and unfavorable spectra.

FIG. 4 shows an exemplary first spectral diagram 300 relating to the ambient light 110. The first spectral diagram 300 applies for ambient light 110 with a correlated color temperature of 3200 K. An evaluation 301, i.e., the value of the evaluation function defined above, is plotted on a horizontal axis of the first spectral diagram 300. A first relative spectral power 302, which is defined as the value $(F_1 U_{tot})/(F_{tot} U_1)$, is plotted on a vertical axis of the first spectral diagram 300. Each spectrum 210 studied is represented by a point in the first spectral diagram 300. Favorable spectra 211 with a low value of the evaluation function lie on the left in the first spectral diagram 300. Unfavorable spectra 213 with a high value of the evaluation function lie on the right in the first spectral diagram 300. Between them lie moderate spectra 212 with intermediate values of the evaluation function. For favorable spectra 211, the first relative spectral power 302 lies in a characteristic interval.

Figure 5:
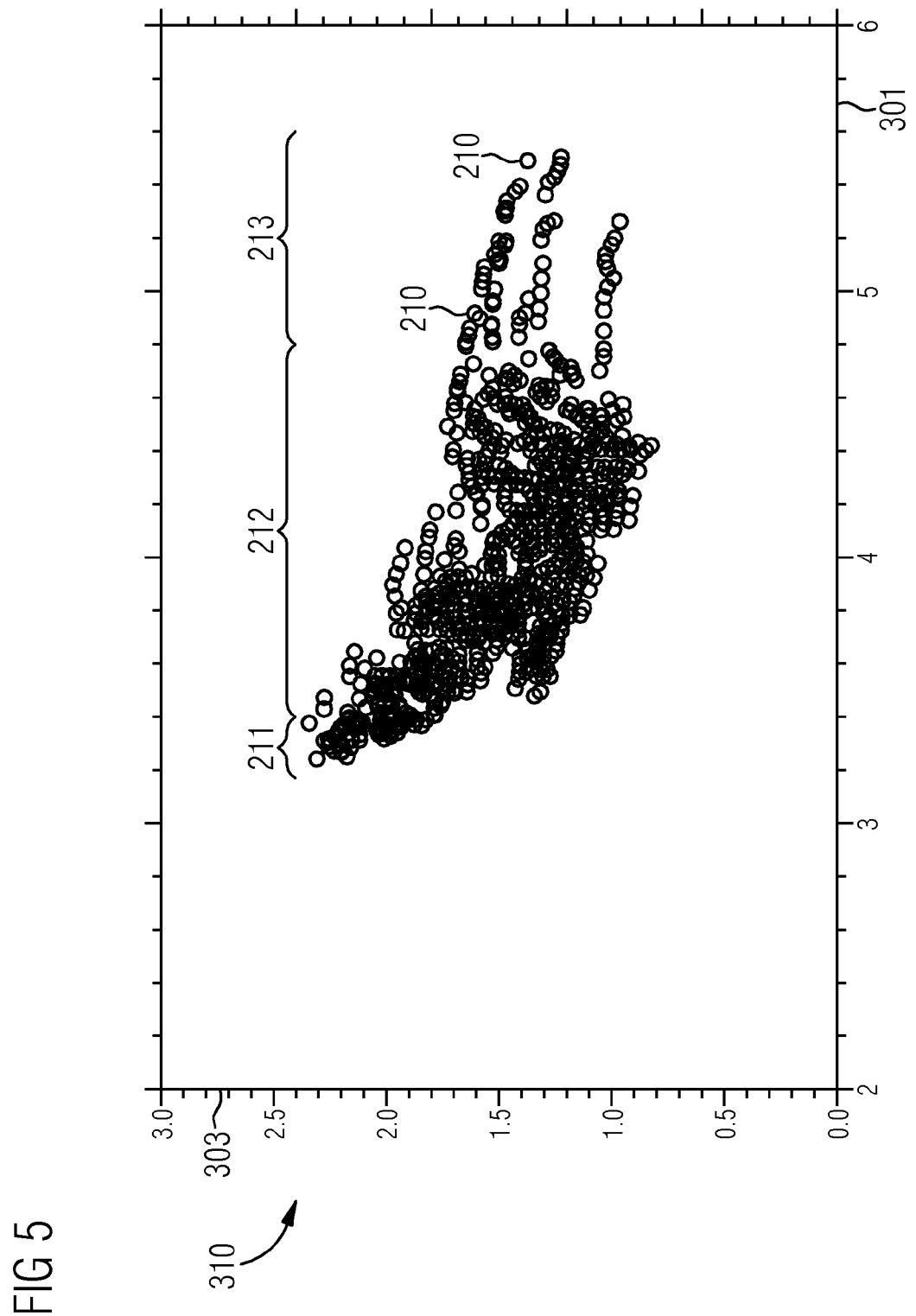
FIG. 5 shows a second spectral diagram relating to ambient light for comparison of favorable and unfavorable spectra.

FIG. 5 shows an exemplary second spectral diagram 301 relating to the ambient light 110. The second spectral diagram again applies for ambient light 110 with a correlated color temperature of 3200 K. The evaluation 301, i.e., the value of the evaluation function, is plotted on a horizontal axis of the second spectral diagram 310 relating to the ambient light 110. A second relative spectral power 303, which is defined by the expression $(F_2 U_{tot})/(F_{tot} U_2)$, is plotted on a vertical axis of the second spectral diagram 310. Each spectrum 210 studied is represented by a point in the second spectral diagram 310. Favorable spectra 211 lie in the left region of the second spectral diagram 310. Unfavorable spectra 213 are represented by points in the right part of the second spectral diagram 310. Between them lie moderate spectra 212. For favorable spectra 211, the second relative spectral power 303 lies in a characteristic interval.

Figure 6:
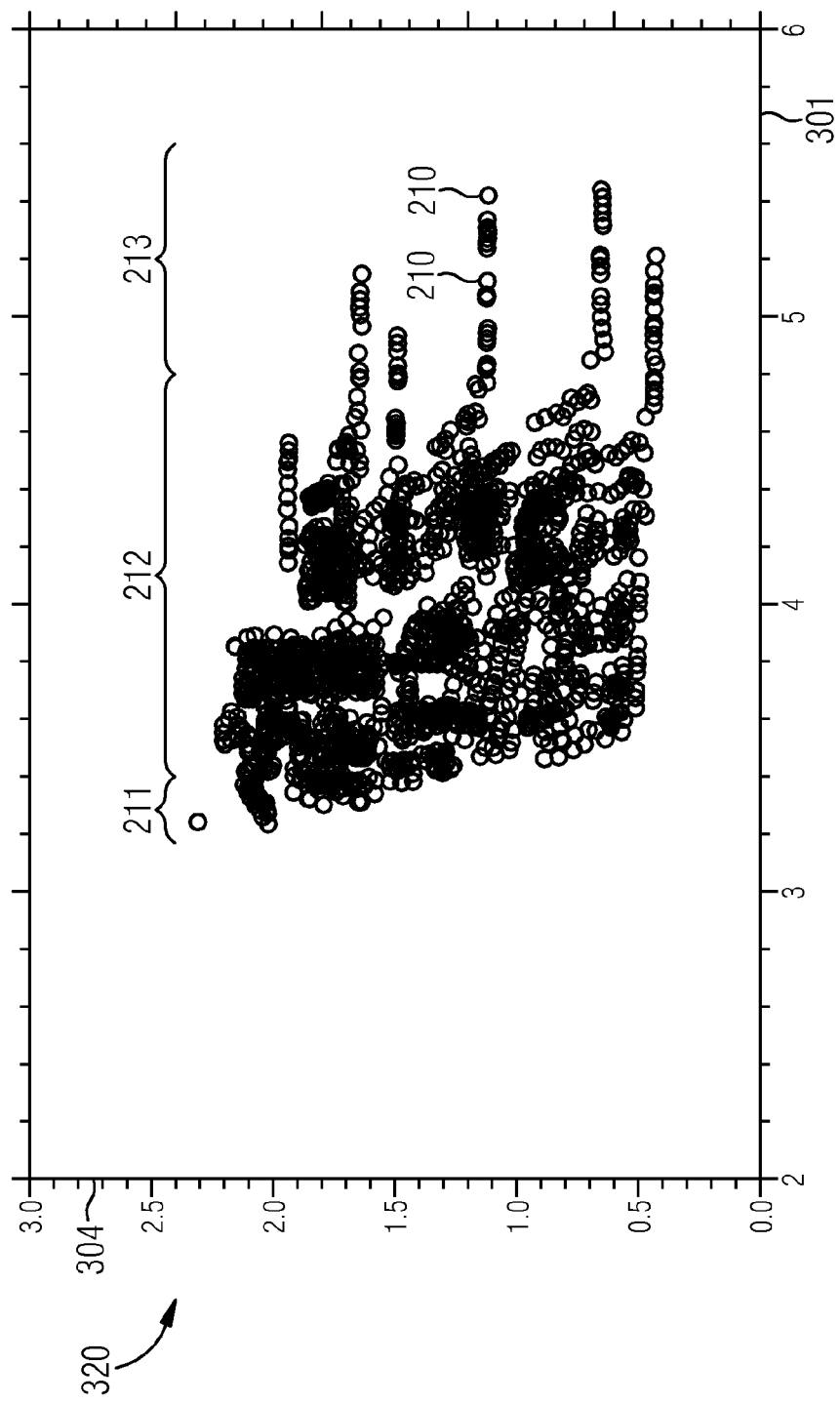
FIG. 6 shows a third spectral diagram relating to ambient light for comparison of favorable and unfavorable spectra.

FIG. 6 shows an exemplary third spectral diagram 320 relating to the ambient light 110. The third spectral diagram 320 relates to ambient light with a correlated color temperature of 3200 K. The evaluation 301 is plotted on a horizontal axis of the third spectral diagram 320. A third relative spectral power 304, which is defined by the expression $(F_3 U_{tot})/(F_{tot} U_3)$, is plotted on a vertical axis of the third spectral diagram 320. Favorable spectra 211 are represented by points in the left region of the third spectral diagram 320. Moderate spectra 212 are represented as points in the central region of the third spectral diagram 320. Unfavorable spectra 213 with a high evaluation function are represented by points in the right region of the third spectral diagram 320. For favorable spectra 211, the third relative spectral power 304 lies in a characteristic interval.

Spectral diagrams similar to the spectral diagrams 300, 310, 320 of FIGS. 4 to 6 may be compiled for ambient light 110 with correlated color temperatures other than 3200 K. General properties of favorable spectra 211 may be read from these spectral diagrams. The properties of favorable spectra 211 with a low evaluation function may be summarized as follows:

|  | 2800 K | 3200 K | 4500 K | 5500 K | 6500 K | 8500 K |
|---|---|---|---|---|---|---|
| $(F_1 U_{tot})/(F_{tot} U_1)$ | 1.6-4.2 | 1.6-3 | 1.2-2.6 | 1-2.4 | 1-2.2 | 1-2.2 |
| $(F_2 U_{tot})/(F_{tot} U_2)$ | 1.9-2.7 | 1.7-2.4 | 1.4-2 | 1.3-1.9 | 1.3-1.9 | 1.2-1.9 |
| $(F_3 U_{tot})/(F_{tot} U_3)$ | 1.4-2.5 | 1.3-2.2 | 1.2-1.8 | 1.2-1.8 | 1.1-1.7 | 1.1-1.7 |

It may, for example, be inferred from the table above that, in the case of a favorable spectrum 211 of the flash light 120 with ambient light 110 having a correlated color temperature of 4500 K, the second relative spectral power 303 $(F_2 U_{tot})/(F_{tot} U_2)$ should lie between 1.4 and 2.

Characterization of favorable spectra 211 of the flash light 120 is also possible in terms of their spectral components in limited wavelength intervals in relation to the respective overall spectrum.

Figure 7:
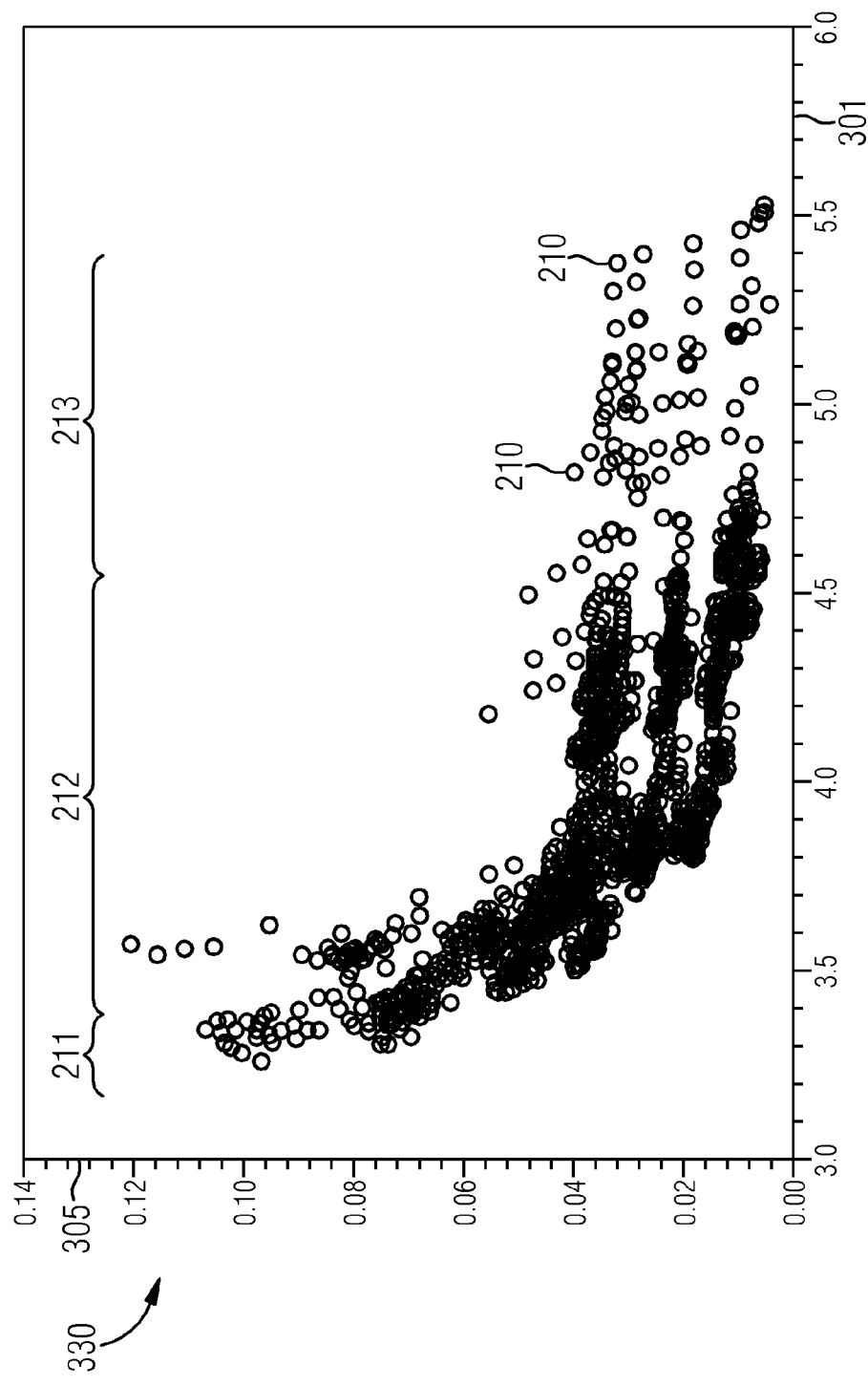
FIG. 7 shows a first spectral diagram relating to the overall spectrum for comparison of favorable and unfavorable spectra.

FIG. 7 shows by way of example a first spectral diagram 330 relating to the respective overall spectrum. The first spectral diagram 330 relating to the overall spectrum applies for ambient light 110 with a correlated color temperature of 3200 K. The evaluation 301 of the respective spectrum 210 is again plotted on a horizontal axis of the first spectral diagram 330 relating to the overall spectrum. A first fractional spectral power 305 is plotted on a vertical axis of the first spectral diagram 330 relating to the respective overall spectrum. This is defined by the expression $F_1/F_{tot}$. Each spectrum 210 studied is represented by a point in the first spectral diagram 330 relating to the overall spectrum. Favorable spectra 211 lie in the left region of the diagram 330. Moderate spectra 212 are represented in the central region of the diagram 330. Unfavorable spectra 213 are represented by points in the right region of the first spectral diagram 330 relating to the overall spectrum. For favorable spectra 211, the first fractional spectral power 305 lies in a characteristic interval.

Figure 8:
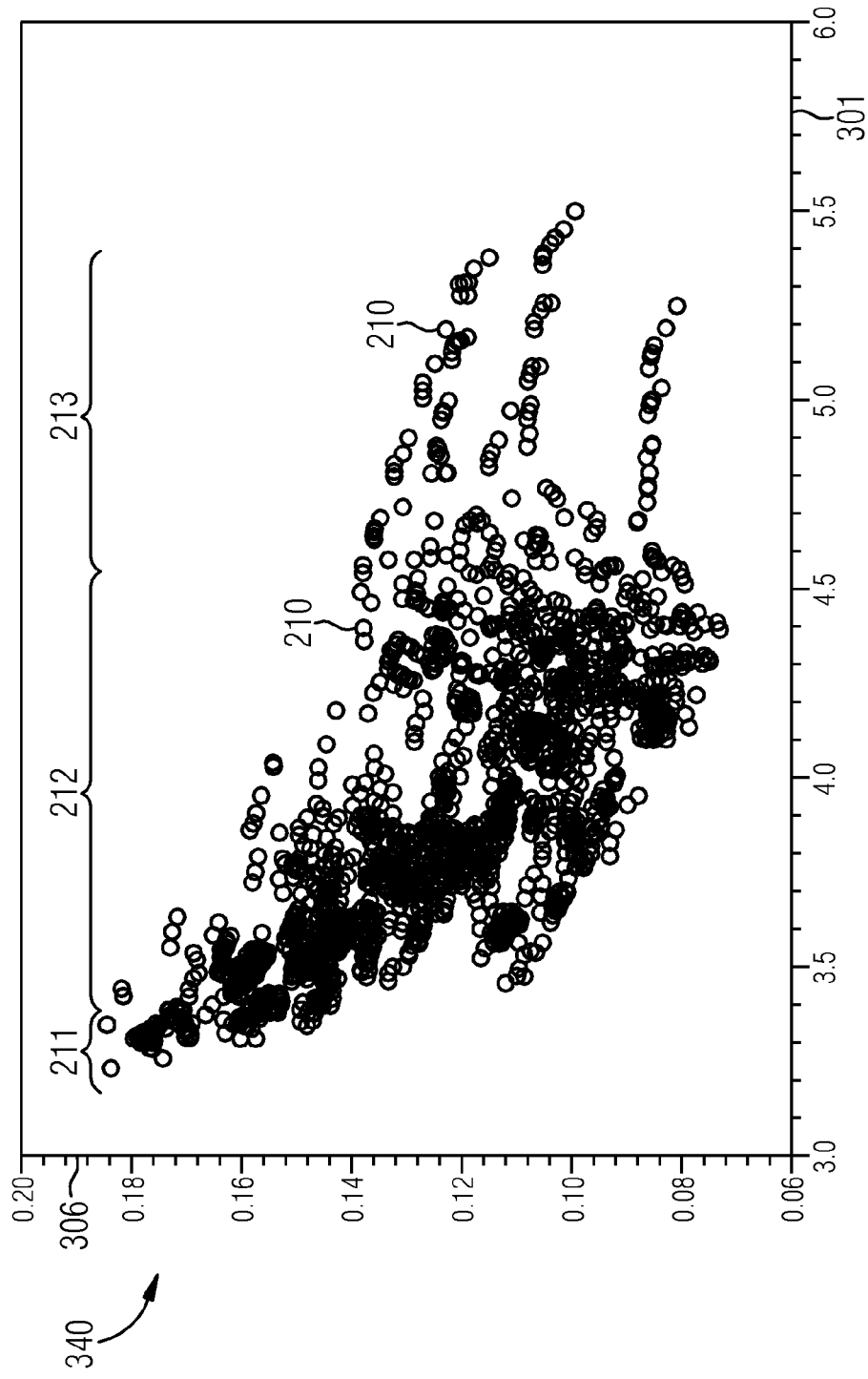
FIG. 8 shows a second spectral diagram relating to the overall spectrum for comparison of favorable and unfavorable spectra.

FIG. 8 shows an exemplary second spectral diagram 340 relating to the respective overall spectrum. The second spectral diagram 340 relating to the respective overall spectrum also applies for ambient light 110 with a correlated color temperature of 3200 K. The evaluation 301 is again plotted on a horizontal axis. A second fractional spectral power 306, which is defined by the expression $F_2/F_{tot}$, is plotted on a vertical axis. Favorable spectra 211 with a low evaluation 301, i.e., a low value of the evaluation function, are represented in the left region of the second spectral diagram 340 relating to the overall spectrum. Moderate spectra 212 lie in the central region of the second spectral diagram 340 relating to the overall spectrum. Unfavorable spectra 213 are represented in the right region of the second spectral diagram 340 relating to the overall spectrum. For favorable spectra 211, the second fractional spectral power 306 lies in a characteristic interval.

Figure 9:
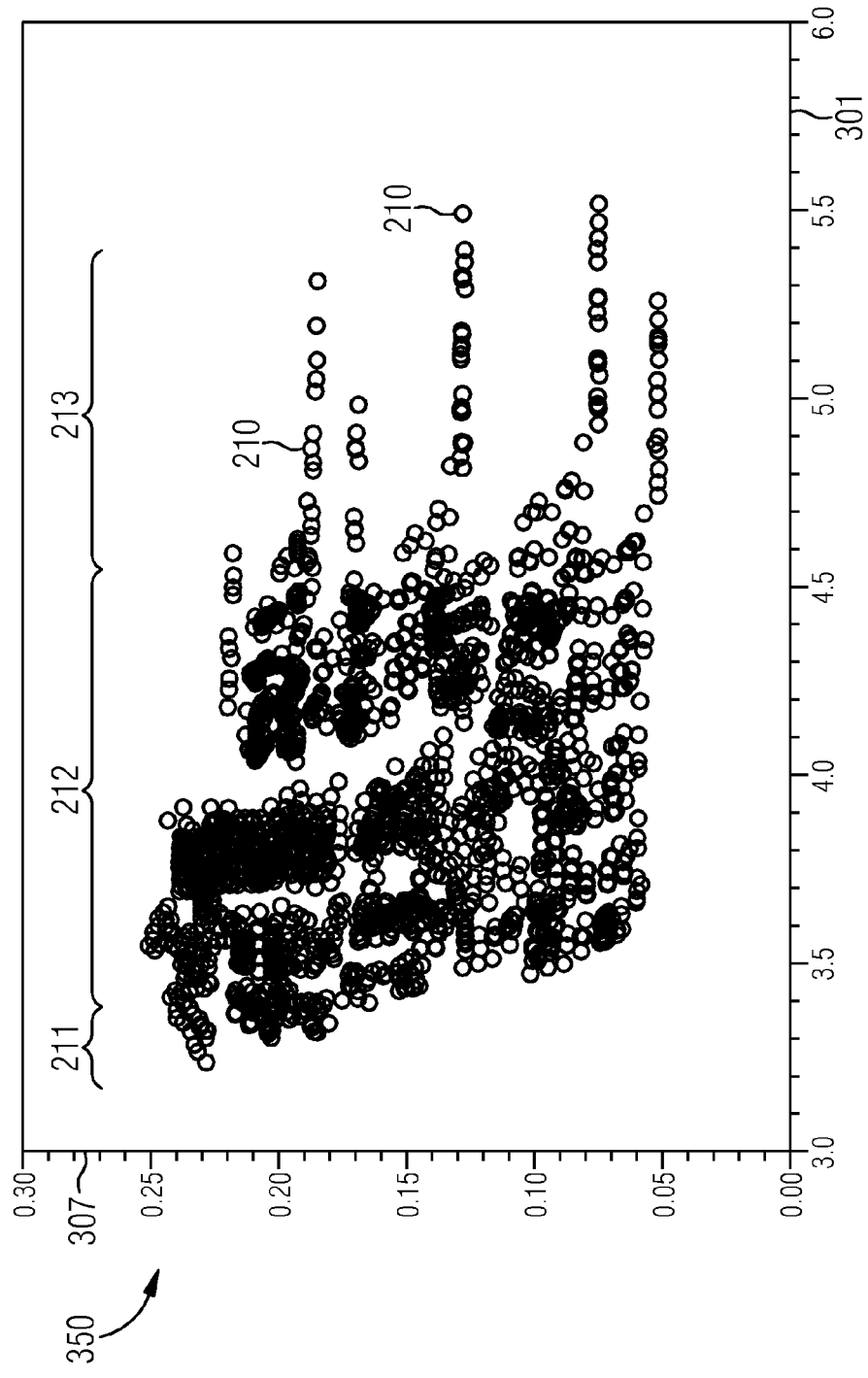
FIG. 9 shows a third spectral diagram relating to the overall spectrum for comparison of favorable and unfavorable spectra.

FIG. 9 shows an exemplary third spectral diagram 350 relating to the respective overall spectrum. The third spectral diagram 350 relating to the overall spectrum also applies for ambient light 110 with a correlated color temperature of 3200 K. The evaluation 301 of a spectra 210 studied is again plotted on a horizontal axis. A third fractional spectral power 307, which is defined by the expression $F_3/F_{tot}$, is plotted on a vertical axis. Favorable spectra 211 with a low value of the evaluation function lie in the left region of the diagram 350. Unfavorable spectra 213 are represented in the right region of the diagram 350. Moderate spectra 212 lie between them. For favorable spectra 211, the third fractional spectral power 307 lies in a characteristic interval.

Common properties of favorable spectra 211 with a low value of the evaluation function can be read from the spectral diagrams 330, 340, 350 relating to the respective overall spectrum in FIGS. 7 to 9 and from respectively similar diagrams for ambient light 110 with other correlated color temperatures. The common properties, found in this way, of favorable spectra 211 may be summarized for different correlated color temperatures of the ambient light 110 as in the following table:

|            | 2800 K | 3200 K | 4500 K | 5500 K | 6500 K | 8500 K |
|---|---|---|---|---|---|---|
| $F_1/F_{tot}$ | 0.04- 0.09 | 0.05- 0.12 | 0.08- 0.18 | 0.1- 0.23 | 0.12- 0.26 | 0.14- 0.29 |
| $F_2/F_{tot}$ | 0.12- 0.18 | 0.13- 0.19 | 0.15- 0.22 | 0.15- 0.23 | 0.16- 0.23 | 0.16- 0.23 |
| $F_3/F_{tot}$ | 0.14- 0.28 | 0.14- 0.25 | 0.13- 0.21 | 0.13- 0.18 | 0.12- 0.17 | 0.11- 0.15 |

It may, for example, be inferred from the table above that, in the case of ambient light 110 with a correlated color temperature of 6500 K, flash light 120 with a favorable spectrum 211 has a second fractional spectral power 306, defined by the expression $F_2/F_{tot}$, of between 0.16 and 0.23.

Figure 10:
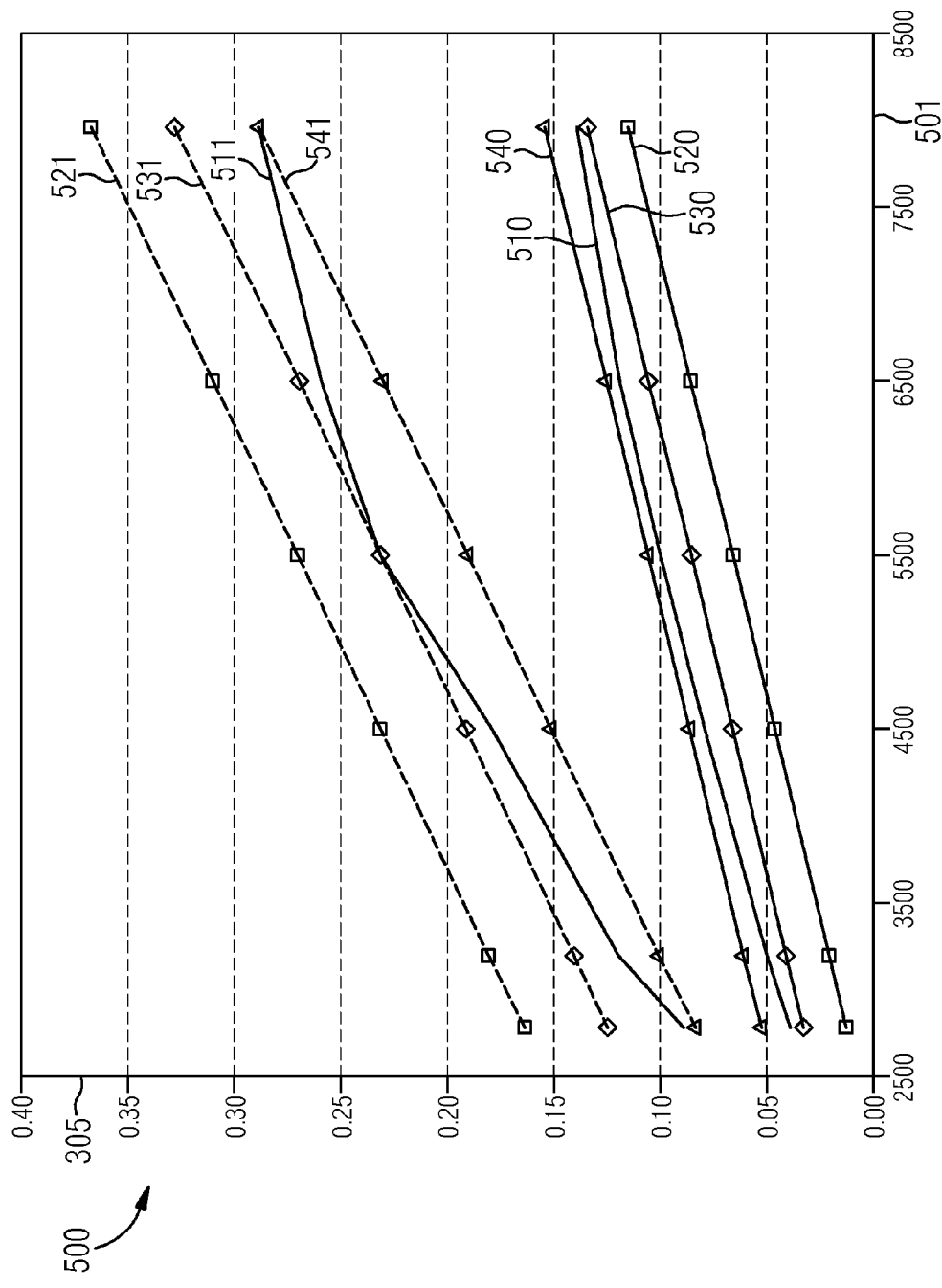
FIG. 10 shows a first characterization diagram for characterization of favorable spectra.

FIG. 10 shows a schematic first characterization diagram 500 for further characterization of the favorable spectra 211. A correlated color temperature 501 of the ambient light 110 in K is plotted on a horizontal axis of the first characterization diagram 500. The first fractional spectral power 305 of a spectrum 210 of the flash light 120 is plotted on a vertical axis of the first characterization diagram 500.

A first lower limit 510 represents the values, specified in the table above, of the lower limit of the first fractional spectral power 305, which have favorable spectra 211 with different values of the correlated color temperature 501 of the ambient light 110. A first upper limit 511 represents the corresponding maximum values of the first fractional spectral power 305 for favorable spectra 211.

First lower interval limits 520, 530, 540 linearly approximate the profile, dependent on the correlated color temperature 501, of the first lower limit 510. First upper interval limits 521, 531, 541 linearly approximate the profile, dependent on the correlated color temperature 501, of the first upper limit 511. The regions between the first lower interval limits 520, 530, 540 and the first upper interval limits 521, 531, 541 approximate with different closeness the value range, possible for favorable spectra 211, of the first fractional spectral power 305 between the first lower limit 510 and the first upper limit 511.

The first broad lower interval limit 520 is defined by the function $1.96\times10^{-5}/K\times T-4.13\times10^{-2}$. Here, T stands for the correlated color temperature 501, while K stands for the kelvin unit. The first broad upper interval limit 521 is defined by the function $3.91\times10^{-5}/K\times T+5.63\times10^{-2}$. The first central lower interval limit 530 is defined by the function $1.96\times10^{-5}/K\times T-2.13\times10^{-2}$. The first central upper interval limit 531 is defined by the function $3.91\times10^{-5}/K\times T+1.63\times10^{-2}$. The first narrow lower interval limit 540 is defined by the function $1.96\times10^{-5}/K\times T-1.30\times10^{-3}$. The first narrow upper interval limit 541 is defined by the function $3.91\times10^{-5}/K\times T-2.37\times10^{-2}$.

A favorable spectrum of the flash light 120 for all correlated color temperatures 501 of the ambient light 110 is defined in that its first fractional spectral power 305 lies between the first broad lower interval limit 520 and the first broad upper interval limit 521. Preferably, the first fractional spectral power 305 of a favorable spectrum 211 lies between the first central low interval limit 530 and the first central upper interval limit 531. Particularly preferably, the first fractional spectral power 305 of a favorable spectrum 211 lies between the first narrow lower interval limit 540 and the first narrow upper interval limit 541.

Figure 11:
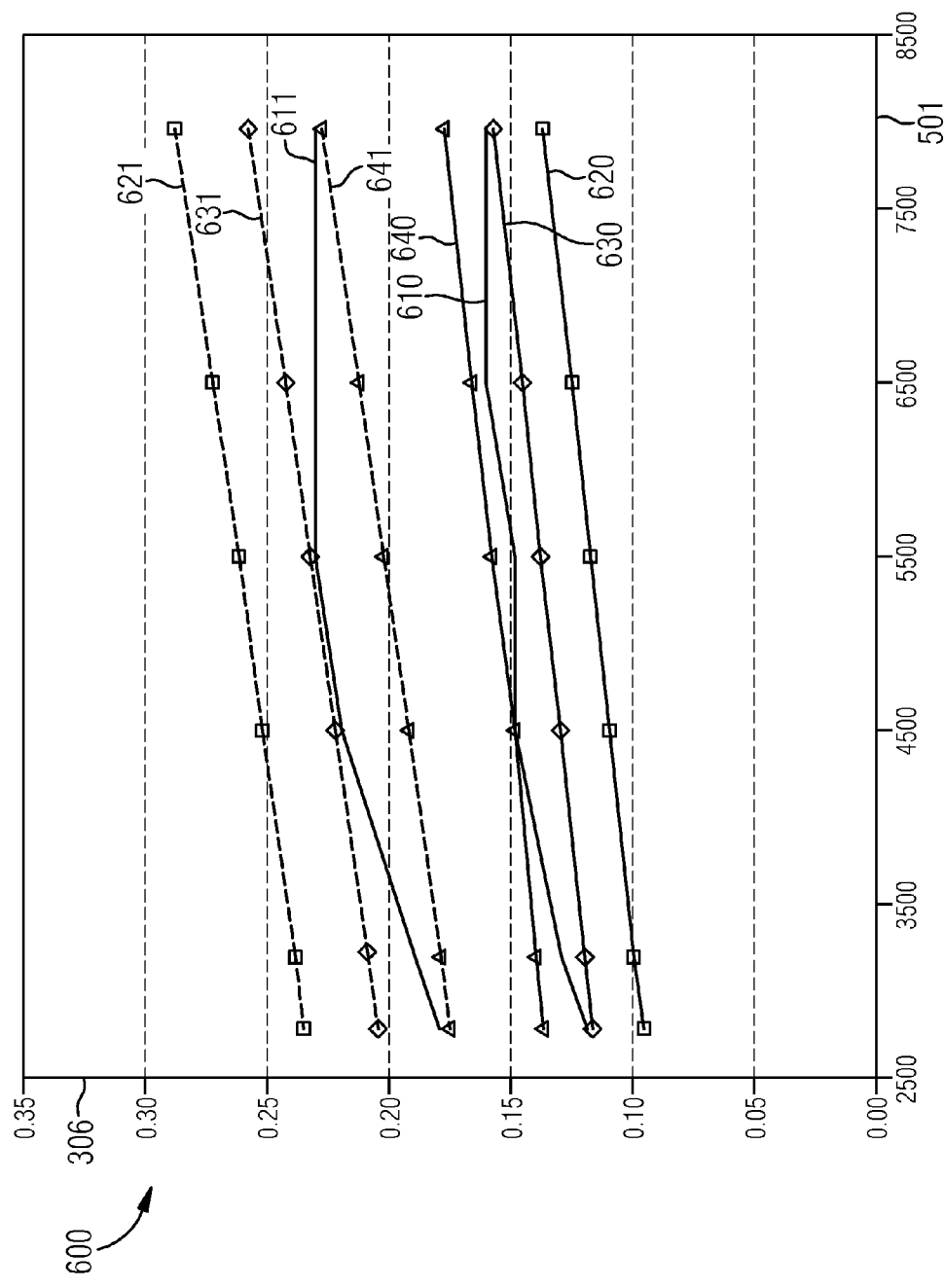
FIG. 11 shows a second characterization diagram for characterization of favorable spectra.

FIG. 11 shows a second characterization diagram 600 for further characterization of favorable spectra 211. The correlated color temperature 501 of the ambient light 110 is again represented on a horizontal axis of the second characterization diagram 600. The second fractional spectral power 306 is plotted on a horizontal axis of the second characterization diagram 600. A second lower limit 610 and a second upper limit 611 indicate the limits between which the values of the second fractional spectral power 306 lie in the case of favorable spectra 211 with different correlated color temperatures 501 according to the table above.

The second lower limit 610 is linearly approximated by second lower interval limits 620, 630, 640. The second upper limit 611 is linearly approximated by second upper interval limits 621, 631, 641. A second broad lower interval limit 620 is defined by the function $7.55\times10^{-6}/K\times T+7.66\times10^{-2}$. A second broad upper interval limit 621 is defined by the function $9.87\times10^{-6}/K\times T+2.08\times10^{-1}$. A second central lower interval limit 630 is defined by the function $7.55\times10^{-6}/K\times T+9.66\times10^{-2}$. A second central upper interval limit 631 is defined by the function $9.87\times10^{-6}/K\times T+1.78\times10^{-1}$. A second narrow lower interval limit 640 is defined by the function $7.55\times10^{-6}/K\times T+1.17\times10^{-1}$. A second narrow upper interval limit 641 is defined by the function $9.87\times10^{-6}/K\times T+1.48\times10^{-1}$.

A favorable spectrum 211 of the flash light 120 for all correlated color temperatures 501 of the ambient light 110 is defined in that its second fractional spectral power 306 lies between the second broad lower interval limit 620 and the second broad upper interval limit 621. Preferably, the second fractional spectral power 306 lies between the second central lower interval limit 630 and the second central upper interval limit 631. Particularly preferably, the second fractional spectral power 306 of a favorable spectrum 211 of the flash light 120 lies between the second narrow lower interval limit 640 and the second narrow upper interval limit 641.

Figure 12:
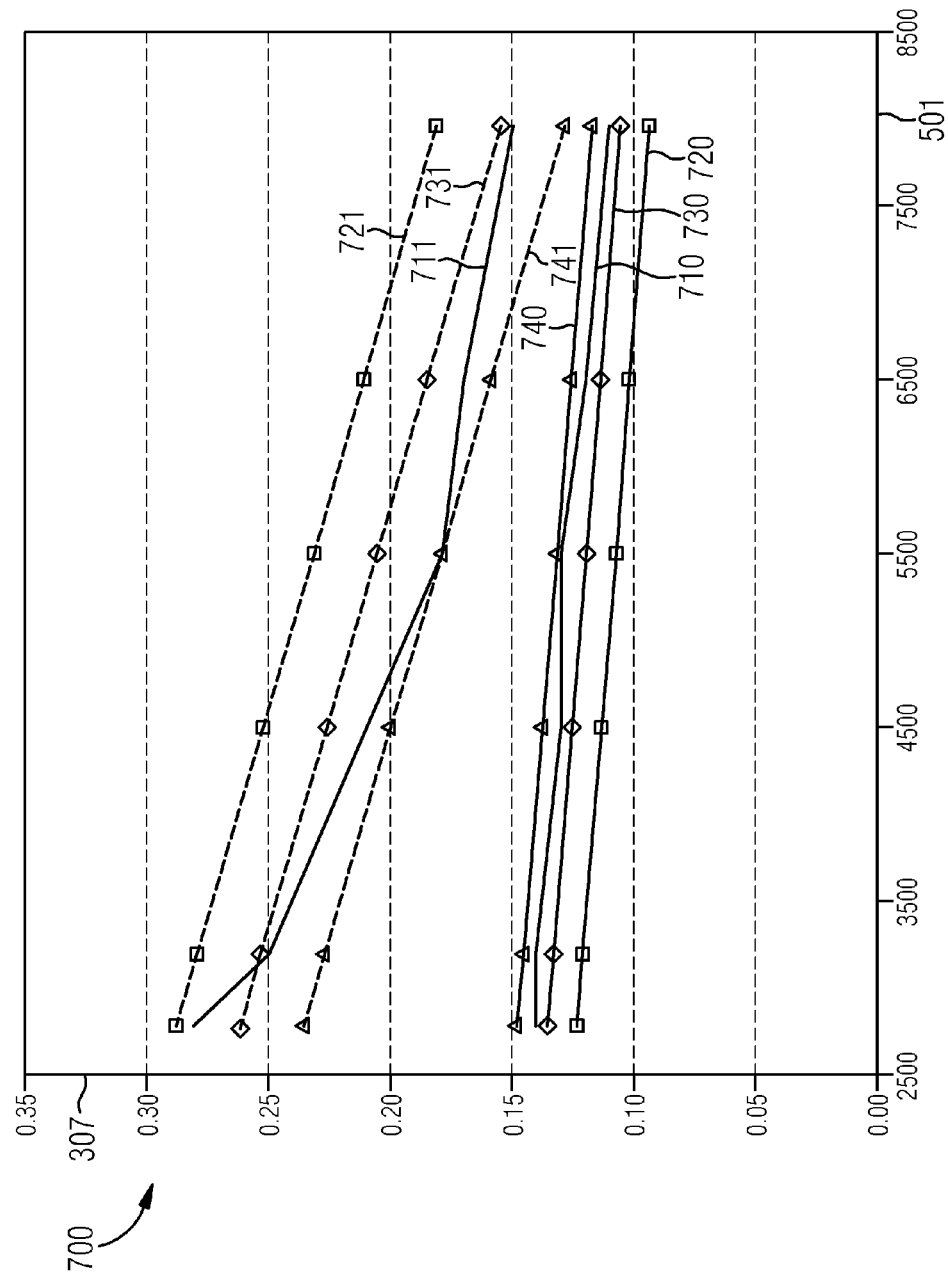
FIG. 12 shows a third characterization diagram for characterization of favorable spectra.

FIG. 12 shows a schematic third characterization diagram 700 for further characterization of suitable spectra 211 of the flash light 120 in the case of different correlated color temperatures of the ambient light 110. The correlated color temperature 501 of the ambient light 110 is plotted on a horizontal axis of the third characterization diagram 700. The third fractional spectral power 307 is represented on a vertical axis of the third characterization diagram 700. A third lower limit 710 and a third upper limit 711 indicate the limits of the values of the third fractional spectral power 307, which may occur according to the table above in the case of different correlated color temperatures 501 of the ambient light 110 for favorable spectra 211 of the flash light 120.

A third broad lower interval limit 720 defined by the function $-5.77 \times 10^{-6}/K \times T + 1.40 \times 10^{-1}$ linearly approximates the third lower limit 710. A third broad upper interval limit 720 defined by the function $-2.06 \times 10^{-5}/K \times T + 3.45 \times 10^{-1}$ linearly approximates the third upper limit 711. A third central lower interval limit 730, which is defined by the function $-5.77 \times 10^{-6}/K \times T + 1.52 \times 10^{-1}$, linearly approximates the third lower limit 710. A third central upper interval limit 731 defined by the function $-2.06 \times 10^{-5}/K \times T + 3.19 \times 10^{-1}$ linearly approximates the third upper limit 711. A third narrow lower interval limit 740 defined by the function $-5.77 \times 10^{-6}/K \times T + 1.64 \times 10^{-1}$ linearly approximates the third lower limit 710. A third narrow upper interval limit 741, which is defined by the function $-2.06 \times 10^{-5}/K \times T + 2.93 \times 10^{-1}$, linearly approximates the third upper limit 711.

A favorable spectrum 211 of the flash light 120 for all correlated color temperatures 501 of the ambient light 110 is defined in that its third fractional spectral power 307 lies between the third broad lower interval limit 720 and the third broad upper interval limit 721. Preferably, the third fractional spectral power 307 of a favorable spectrum 211 lies between the third central lower interval limit 730 and the third central upper interval limit 731. Particularly preferably, the third fractional spectral power 307 of a favorable spectrum 211 of the flash light 120 lies between the third narrow lower interval limit 740 and the third narrow upper interval limit 741.

Figure 13:
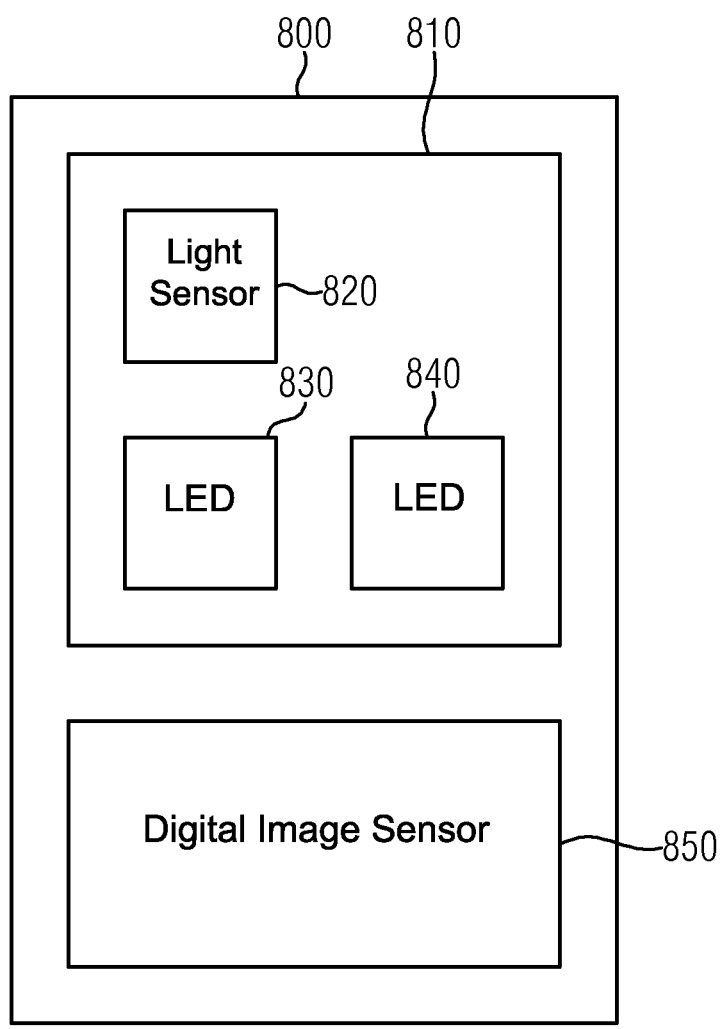
FIG. 13 shows a highly schematized representation of a camera having an illumination device.

FIG. 13 shows a highly schematized representation of a camera 800. The camera 800 is preferably a digital camera with a digital image sensor 850. The camera 800 may, for example, be integrated into a cellphone or configured as a cellphone.

The camera 800 comprises an illumination device 810. The illumination device 810 may also be referred to as a flash device. The illumination device 810 is used to illuminate an environment of the camera 800 at a time at which a recording of this environment is made with the camera 800. The illumination device 810 in this case illuminates the environment with light which has a favorable spectrum 211 according to the definition described above. In this way, when observed, recordings made by the camera 800 impart to an observer a color impression which has only small differences from a color impression that the observer receives from direct observation of the photographed environment.

The illumination device 810 comprises an ambient light detection sensor 820, which is used to detect ambient light present in the environment of the camera 800. The ambient light detection sensor 820 is configured in order to determine a correlated color temperature of the detected ambient light. With the aid of the correlated color temperature determined in this way, the illumination device 810 can determine a spectrum 211 of the flash light which is favorable for this correlated color temperature of the ambient light.

The ambient light detection sensor 820 may also be implemented as the digital image sensor 850 of the camera 800. A separate ambient light detection sensor 820 is then not necessary.

The illumination device 810 furthermore comprises a first light-emitting diode 830 and a second light-emitting diode 840. The first light-emitting diode 830 and the second light-emitting diode 840 are respectively configured in order to emit electromagnetic radiation (visible light) with an established spectral composition. The spectral composition of the electromagnetic radiation emitted by the second light-emitting diode 840 differs from the spectral composition of the electromagnetic radiation emitted by the first light-emitting diode 830. The illumination device 810 is configured in order to drive the first light-emitting diode 830 and the second light-emitting diode 840 so that the electromagnetic radiations emitted by the first light-emitting diode 830 and the second light-emitting diode 840 are superimposed in such a way that the resulting overall radiation has the favorable spectrum 211 determined previously by the illumination device 810.

The illumination device 810 may also comprise more than two light-emitting diodes 830, 840. It is, however, also possible to configure the illumination device 810 with only one light-emitting diode 830.

The invention has been illustrated and described in detail with the aid of preferred exemplary embodiments. The invention is not, however, restricted to the examples described. Rather, other variants may be derived therefrom by the person skilled in the art without departing from the protective scope of the invention.

The invention claimed is:

1. A method for illuminating an environment with electromagnetic radiation, the method comprising:
   determining, by a light sensor of an illumination device, a correlated color temperature of ambient light; and
   selecting, by the illumination device, a spectral power of the electromagnetic radiation in such a way that:
   an integral of the spectral power over a wavelength interval between 380 nm and 780 nm has a nominal value;
   an integral of the spectral power over a wavelength interval between 420 nm and 460 nm has a first value;
   an integral of the spectral power over a wavelength interval between 510 nm and 550 nm has a second value;
   an integral of the spectral power over a wavelength interval between 580 nm and 620 nm has a third value;
   the ratio of the first value to the nominal value lies between the sum of $-4.13 \times 10^{-2}$ and the product of $+1.96 \times 10^{-5}$/Kelvin (K) and the correlated color temperature and the sum of $+5.63 \times 10^{-2}$ and the product of $+3.91 \times 10^{-5}$/K and the correlated color temperature;
   the ratio of the second value to the nominal value lies between the sum of $+7.66 \times 10^{-2}$ and the product of $+7.55 \times 10^{-6}$/K and the correlated color temperature and the sum of $+2.08 \times 10^{-1}$ and the product of $+9.87 \times 10^{-6}$/K and the correlated color temperature; and
   the ratio of the third value to the nominal value lies between the sum of $+1.40 \times 10^{-1}$ and the product of −5.77×10⁻⁶/K and the correlated color temperature and the sum of +3.45×10⁻¹ and the product of −2.06×10⁻⁵/K and the correlated color temperature; and illuminating the environment, by a light source of the illumination device, with the selected spectral power of the electromagnetic radiation.

2. The method as claimed in claim 1, wherein the spectral power of the electromagnetic radiation is selected in such a way that:

the ratio of the first value to the nominal value lies between the sum of −2.13×10⁻² and the product of +1.96×10⁻⁵/K and the correlated color temperature and the sum of +1.63×10⁻² and the product of +3.91×10⁻⁶/K and the correlated color temperature;

the ratio of the second value to the nominal value lies between the sum of +9.66×10⁻² and the product of +7.55×10⁻⁶/K and the correlated color temperature and the sum of +1.78×10⁻¹ and the product of +9.87×10⁻⁵/K and the correlated color temperature; and the ratio of the third value to the nominal value lies between the sum of +1.52×10⁻¹ and the product of −5.77×10⁻⁶/K and the correlated color temperature and the sum of +3.19×10⁻¹ and the product of −2.06×10⁻⁵/K and the correlated color temperature.

3. The method as claimed in claim 2, wherein the spectral power of the electromagnetic radiation is selected in such a way that:

the ratio of the first value to the nominal value lies between the sum of −1.30×10⁻³ and the product of +1.96×10⁻⁵/K and the correlated color temperature and the sum of −2.37×10⁻² and the product of +3.91×10⁻⁵/K and the correlated color temperature;

the ratio of the second value to the nominal value lies between the sum of +1.17×10⁻¹ and the product of +7.55×10⁻⁶/K and the correlated color temperature and the sum of +1.48×10⁻¹ and the product of +9.87×10⁻⁶/K and the correlated color temperature; and the ratio of the third value to the nominal value lies between the sum of +1.64×10⁻¹ and the product of −5.77×10⁻⁶/K and the correlated color temperature and the sum of +2.93×10⁻¹ and the product of −2.06×10⁻⁵/K and the correlated color temperature.

4. An illumination device, which is configured in order to carry out a method as claimed in claim 1.

5. The illumination device as claimed in claim 4, wherein the illumination device comprises a light-emitting diode.

6. The illumination device as claimed in claim 5, wherein the illumination device comprises at least two light-emitting diodes.

7. The illumination device as claimed in claim 4, wherein the illumination device comprises a sensor for detecting ambient light.

8. A camera having an illumination device as claimed in claim 4.

9. The camera as claimed in claim 8, wherein the illumination device is configured as a flash device.

10. The camera as claimed in claim 8, wherein the camera comprises a digital image sensor.

11. The camera as claimed in claim 8, wherein the camera is configured as a cellphone.

12. An illumination device comprising:
a light sensor configured to detect ambient light;
a processor configured to select a spectral power of electromagnetic radiation such that:

an integral of the spectral power over a wavelength interval between 380 nm and 780 nm has a nominal value;

an integral of the spectral power over a wavelength interval between 420 nm and 460 nm has a first value;

an integral of the spectral power over a wavelength interval between 510 nm and 550 nm has a second value;

an integral of the spectral power over a wavelength interval between 580 nm and 620 nm has a third value;

the ratio of the first value to the nominal value lies between the sum of −4.13×10⁻² and the product of +1.96×10⁻⁵/Kelvin (K) and a correlated color temperature and the sum of +5.63×10⁻² and the product of +3.91×10⁻⁵/K and the correlated color temperature;

the ratio of the second value to the nominal value lies between the sum of +7.66×10⁻² and the product of +7.55×10⁻⁶/K and the correlated color temperature and the sum of +2.08×10⁻¹ and the product of +9.87×10⁻⁶/K and the correlated color temperature; and the ratio of the third value to the nominal value lies between the sum of +1.40×10⁻¹ and the product of −5.77×10⁻⁶/K and the correlated color temperature and the sum of +3.45×10⁻¹ and the product of −2.06×10⁻⁵/K and the correlated color temperature; and a light source comprising a light emitting diode, the light source configured to generate the selected spectral power of the electromagnetic radiation based on the correlated color temperature of ambient light detected by the light sensor.

13. The illumination device as claimed in claim 12, wherein the illumination device comprises a plurality of light-emitting diodes.

14. The illumination device as claimed in claim 12, wherein the spectral power of the electromagnetic radiation is selected in such a way that:

the ratio of the first value to the nominal value lies between the sum of −2.13×10⁻² and the product of +1.96×10⁻⁵/K and the correlated color temperature and the sum of +1.63×10⁻² and the product of +3.91×10⁻⁶/K and the correlated color temperature;

the ratio of the second value to the nominal value lies between the sum of +9.66×10⁻² and the product of +7.55×10⁻⁶/K and the correlated color temperature and the sum of +1.78×10⁻¹ and the product of +9.87×10⁻⁵/K and the correlated color temperature; and the ratio of the third value to the nominal value lies between the sum of +1.52×10⁻¹ and the product of −5.77×10⁻⁶/K and the correlated color temperature and the sum of +3.19×10⁻¹ and the product of −2.06×10⁻⁵/K and the correlated color temperature.

15. The illumination device as claimed in claim 12, wherein the spectral power of the electromagnetic radiation is selected in such a way that:

the ratio of the first value to the nominal value lies between the sum of −1.30×10⁻³ and the product of +1.96×10⁻⁵/K and the correlated color temperature and the sum of −2.37×10⁻² and the product of +3.91×10⁻⁵/K and the correlated color temperature;

the ratio of the second value to the nominal value lies between the sum of +1.17×10⁻¹ and the product of +7.55×10⁻⁶/K and the correlated color temperature and the sum of +1.48×10⁻¹ and the product of +9.87×10⁻⁶/K and the correlated color temperature; and the ratio of the third value to the nominal value lies between the sum of +1.64×10⁻¹ and the product of −5.77×10⁻⁶/K and the correlated color temperature and the sum of $+2.93\times10^{-1}$ and the product of $-2.06\times10^{-5}$/K and the correlated color temperature.

16. A camera comprising:
a digital image sensor;
a flash device coupled to the digital image sensor, the flash device comprising a light sensor configured to detect ambient light and a light source comprising a light emitting diode; and
a processor configured to select a spectral power of electromagnetic radiation such that:
an integral of the spectral power over a wavelength interval between 380 nm and 780 nm has a nominal value;
an integral of the spectral power over a wavelength interval between 420 nm and 460 nm has a first value;
an integral of the spectral power over a wavelength interval between 510 nm and 550 nm has a second value;
an integral of the spectral power over a wavelength interval between 580 nm and 620 nm has a third value;
the ratio of the first value to the nominal value lies between the sum of $-4.13\times10^{-2}$ and the product of $+1.96\times10^{-5}$/Kelvin (K) and a correlated color temperature and the sum of $+5.63\times10^{-2}$ and the product of $+3.91\times10^{-5}$/K and the correlated color temperature;
the ratio of the second value to the nominal value lies between the sum of $+7.66\times10^{-2}$ and the product of $+7.55\times10^{-6}$/K and the correlated color temperature and the sum of $+2.08\times10^{-1}$ and the product of $+9.87\times10^{-6}$/K and the correlated color temperature; and
the ratio of the third value to the nominal value lies between the sum of $+1.40\times10^{-1}$ and the product of $-5.77\times10^{-6}$/K and the correlated color temperature and the sum of $+3.45\times10^{-1}$ and the product of $-2.06\times10^{-5}$/K and the correlated color temperature,
wherein the light source is configured to generate the selected spectral power of the electromagnetic radiation based on the correlated color temperature of the ambient light detected by the light sensor.

17. The camera as claimed in claim 16, wherein the spectral power of the electromagnetic radiation is selected in such a way that:
the ratio of the first value to the nominal value lies between the sum of $-2.13\times10^{-2}$ and the product of $+1.96\times10^{-5}$/K and the correlated color temperature and the sum of $+1.63\times10^{-2}$ and the product of $+3.91\times10^{-6}$/K and the correlated color temperature;
the ratio of the second value to the nominal value lies between the sum of $+9.66\times10^{-2}$ and the product of $+7.55\times10^{-6}$/K and the correlated color temperature and the sum of $+1.78\times10^{-1}$ and the product of $+9.87\times10^{-5}$/K and the correlated color temperature; and
the ratio of the third value to the nominal value lies between the sum of $+1.52\times10^{-1}$ and the product of $-5.77\times10^{-6}$/K and the correlated color temperature and the sum of $+3.19\times10^{-1}$ and the product of $-2.06\times10^{-5}$/K and the correlated color temperature.

18. The camera as claimed in claim 16, wherein the spectral power of the electromagnetic radiation is selected in such a way that:
the ratio of the first value to the nominal value lies between the sum of $-1.30\times10^{-3}$ and the product of $+1.96\times10^{-5}$/K and the correlated color temperature and the sum of $-2.37\times10^{-2}$ and the product of $+3.91\times10^{-5}$/K and the correlated color temperature;
the ratio of the second value to the nominal value lies between the sum of $+1.17\times10^{-1}$ and the product of $+7.55\times10^{-6}$/K and the correlated color temperature and the sum of $+1.48\times10^{-1}$ and the product of $+9.87\times10^{-6}$/K and the correlated color temperature; and
the ratio of the third value to the nominal value lies between the sum of $+1.64\times10^{-1}$ and the product of $-5.77\times10^{-6}$/K and the correlated color temperature and the sum of $+2.93\times10^{-1}$ and the product of $-2.06\times10^{-5}$/K and the correlated color temperature.

19. A cellphone comprising the camera as claimed in claim 16.

* * * * *